C. E. FROST.
BRUSH.
APPLICATION FILED MAR 6, 1919.
1,372,680.
Patented Mar. 29, 1921.
2 SHEETS—SHEET 1.
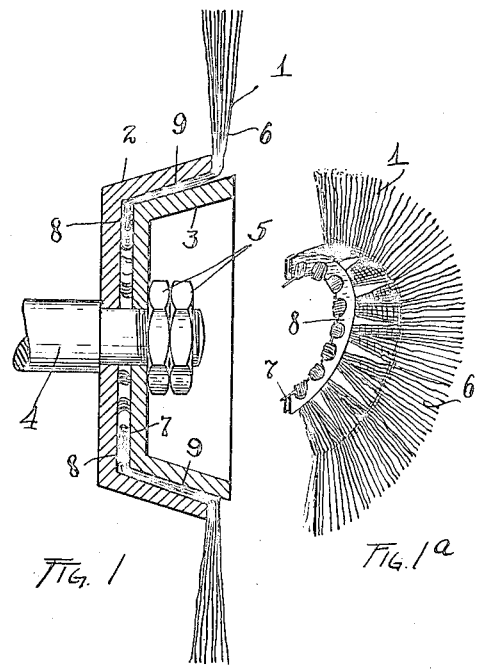
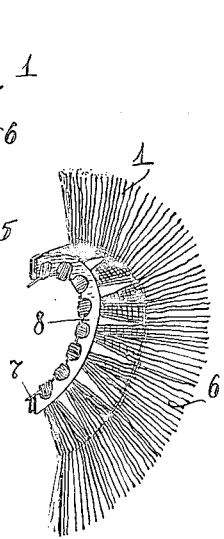
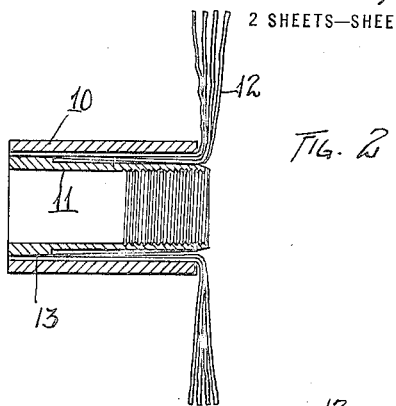
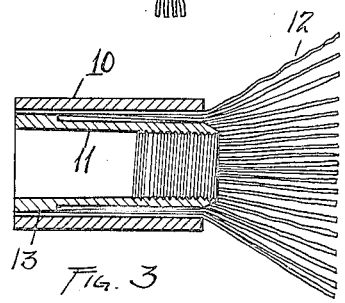
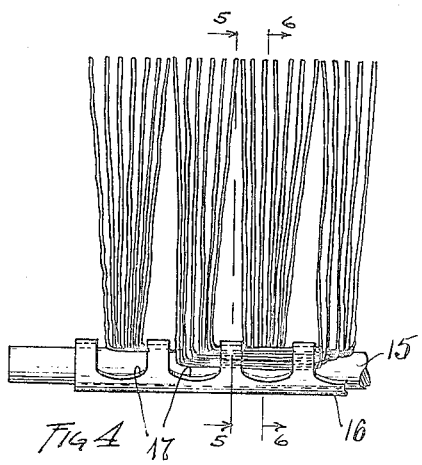
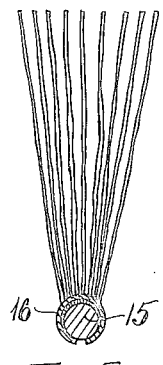
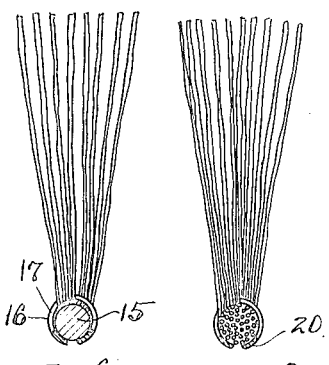
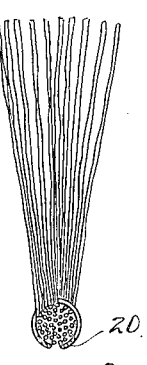
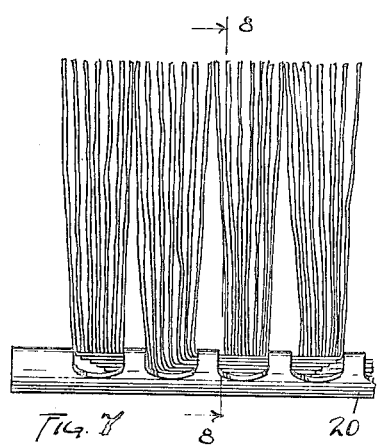
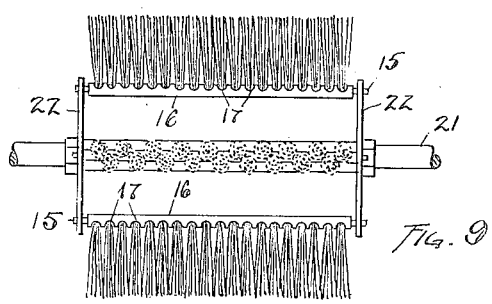
INVENTOR
Clinton E. Frost.
By Day, Oberlin & Day
ATTORNEYS.

INVENTOR
Clinton E. Frost
BY Jay, Oberlin & Jay
ATTORNEYS.

UNITED STATES PATENT OFFICE.

CLINTON E. FROST, OF EAST CLEVELAND, OHIO, ASSIGNOR TO THE CLEVELAND OSBORN MANUFACTURING COMPANY, OF CLEVELAND, OHIO, A CORPORATION OF OHIO.

BRUSH.

1,372,680.

Specification of Letters Patent.  Patented Mar. 29, 1921.

Application filed March 6, 1919. Serial No. 280,934.

*To all whom it may concern:*

Be it known that I, CLINTON E. FROST, a citizen of the United States, and a resident of East Cleveland, county of Cuyahoga, and State of Ohio, have invented a new and useful Improvement in Brushes, of which the following is a specification, the principle of the invention being herein explained and the best mode in which I have contemplated applying that principle, so as to distinguish it from other inventions.

The present improvements have more especial regard to brushes wherein the brushing material is composed of metal strands or wires. There is a large field of use for brushes composed of this material in the mechanical arts, as for cleaning castings, removing scale from sheet metal, preparing surfaces for painting, etc. However, it has never been found practicable heretofore to use strands or wires of other than small diameter, at least in sparsely distributed types of brush, the largest diameter of wire feasible being 0.020 inch. The difficulty has not been in the rapid wearing away of the strands, but in the tendency of the metal to crystallize under the severe vibration to which such strands are subjected in use, so that the latter break off long before they are worn down to a point where the brush would be no longer of use. The harder the steel used, the more this difficulty is emphasized.

The object of the present invention is to provide a method of mounting whereby this tendency on the part of stranded wire brush material to crystallize is reduced to a minimum, so that not only may the strands be made of harder steel, but also of larger diameter; thus increasing to a remarkable degree the field of use and general applicability of brushes in mechanical lines. The improvements in question are adaptable to various types or forms of brushes, both rotary and reciprocable, whether designed for power or manual operation, all as will now be more fully described and particularly pointed out in the claims, the annexed drawings and the following description setting forth in detail certain mechanism embodying the invention, such disclosed means constituting, however, but several of the various mechanical forms in which the principle of the invention may be used.

Figure 10:
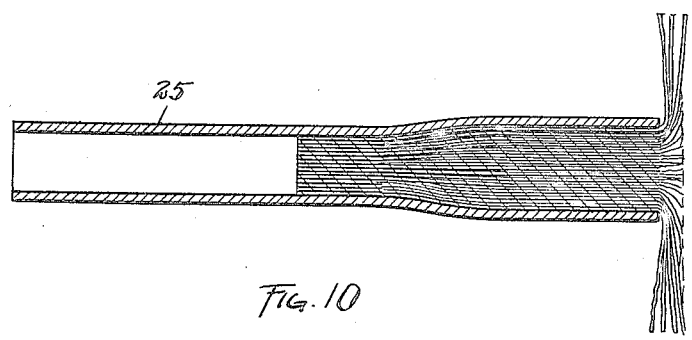
Figure 11:
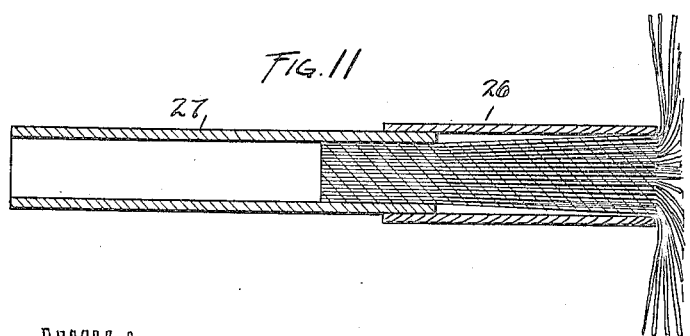
Figure 12:
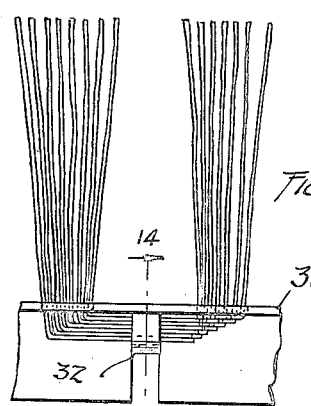
Figure 15:
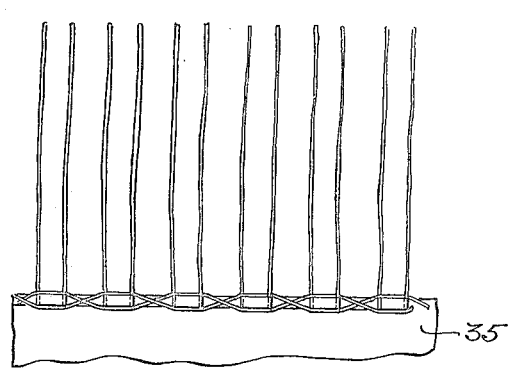
Figure 13:
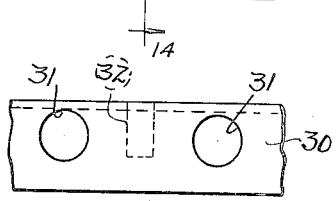
Figure 14:
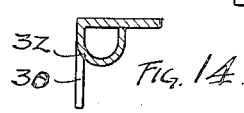
Figure 16:
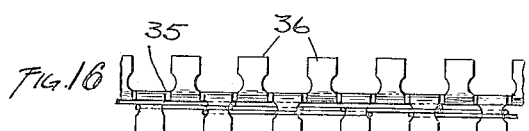

In said annexed drawings:

Figure 1 is a central vertical section of a rotary brush or brush section embodying my present improvements; Fig. 1ᵃ is a perspective of the brush member; Fig. 2 is a similar central section of a modified form of such rotary brush; Fig. 3 is a central sectional view of a cup-shaped brush; Fig. 4 is a broken side elevation of a brush section adapted to be used either in a rotary or reciprocating type of brush; Figs. 5 and 6 are cross-sections of such last named brush, the planes of the sections being indicated by the lines 5—5 and 6—6, Fig. 4; Fig. 7 is a broken side elevation similar to that of Fig. 4, but illustrating a modification in construction; Fig. 8 is a transverse section of such last mentioned form, the plane of the section being indicated by the line 8—8, Fig. 7; Fig. 9 is an elevational view of a mounting for the form of brush section shown in Figs. 4 and 7, adapting the same for use as a rotary brush; Figs. 10 and 11 illustrate in central section two variant forms of rotary brushes somewhat similar to that of Fig. 2; Figs. 12 and 13 show in side elevation and plan respectively a broken section of still another mounting embodying my present improvements adapted for use in brushes of different types; Fig. 14 is a transverse section of such mounting, as indicated by the line 14—14, Fig. 12; and Figs. 15 and 16 are a side elevation and plan view respectively of still another type of mounting embodying my present improvements.

The distinctive feature or principle of construction which is common to the various forms of brushes or brush sections illustrated in the several figures of the drawings, is the disposition and mounting of the component strands which make up the brush material in such fashion that their vibratory motion when in use is converted into a torsional movement. In other words, instead of such strands having to bend transversely of their axes, as in prevailing types of brush construction, they are so formed and mounted as to cause such bending to take on a torsional character about an axis longitudinal of the axis of the strand. As a result it will be seen that the strain of vibration, of bending first in one direction and then the other, may be distributed through any desired length of the strand until a proper balance is reached between the rate of wear at the end of the strand due to frictional engagement with the surface being cleaned and the rate of wear where the strand is secured to the mounting, due to crystallization of the material.

As previously indicated, the construction illustrated in Fig. 1 is a rotary brush or brush section 1, the stranded brush material being held between two cup-shaped clamping members 2 and 3 which are mounted on the end of a spindle 4 and there secured by means of suitable nuts 5. The stranded material 6, composing the brush section proper, includes a base ring 7 about which the brush material is looped, and a metal stamping 8 of U-shape in cross-section laterally engaging said material, said stamping having in effect the shape of a disk which is adapted to be securely clamped between the flat faces of the two clamping members. Beyond such stamping the strands composing the brush material are bent at an obtuse angle approximating a right angle for a portion of their length shown as somewhat less than one-half their remaining extent, and then are rebent, i. e. in the opposite direction through a corresponding angle so that the outer portions of such strands lie in a plane substantially parallel with the flat portions of the clamping plates, or in other words at right angles to the axis of the spindle. The space 9 between the coned portions of the clamping plates is such as to loosely retain the intermediate portions of the strands only; in other words, while they are held more or less definitely in their places, supplementing the base ring and stamping in this respect, each individual strand is nevertheless free to partake of a torsional movement throughout this portion of its length. Accordingly, it will be seen that when the outer portion of such strand is displaced or bent in a plane at right angles to the axis of the spindle, the effect of such bending is not concentrated at any one point, least of all at the base of such outer portion, i. e. where it emerges from between the clamping members, but is distributed as a torsional movement throughout the intermediate portion of such strand.

The construction of brush illustrated in Fig. 2 presents a simpler method for obtaining a brush of disk-like form, the mounting or holder, here consisting simply of outer and inner sleeves 10 and 11 between which the axially extending portions of the strands 12 composing the brush material are firmly clamped at their inner ends. The co-acting face 13 of one of said sleeves, however, is cut away for the remainder of its length so as to leave such axial portions of the strands free to partake of a torsional movement in the resulting enlarged space. The inner sleeve 11 is internally threaded to engage a spindle, as will be readily understood.

In Fig. 3 a mounting similar to that in Fig. 2 is shown, in that it consists of two co-acting sleeves between which the strands composing the brush material are held as before. The strands, however, upon emerging from between the two sleeves are here disposed in conical rather than disk form, so as to make a cup-shaped brush, that is one that may be applied end-on to the surface being cleaned.

The form of brush section illustrated in Figs. 4, 5 and 6 is adapted for use in a rotary brush, by utilizing a mounting such as illustrated in Fig. 9, or in a reciprocable brush, as need not be explained in detail. The base of the brush is a solid or tubular member 15 upon which the strands composing the brush material are clamped by means of a sleeve 16 tightly pressed thereon, such sleeve having a series of spaced openings 17 through which the brush material projects in a radial direction. The component strands of the latter are bent in U-shape so that a portion of each will lie parallel with the base member which defines the axis of the section, this portion converting and taking up in torsional movement the vibrations to which the outer portions of the strands are subjected when in use.

The construction illustrated in Figs. 7 and 8 is similar to that shown in the figures last described, in that U-shaped strands are employed, but these are clamped within a sleeve 20 without the employment of any base member. A larger number of strands can obviously be secured within such clamp member than in the previous construction, rendering the tufts correspondingly thicker. The manner in which torsional action results is, however, the same as before.

The typical mounting illustrated in Fig. 9 for receiving brush sections of the type illustrated in Figs. 4 and 7 respectively, consists simply of a central shaft 21 upon which are fixedly held in spaced relation two end-plates 22 in which in turn are mounted two or more sections of the kind in question. The latter are free to oscillate about their respective axes, but, when the shaft is rapidly rotated, will, due to the centrifugal force developed, assume the radial position shown. However, upon striking against a surface, they may oscillate the necessary amount to clear such surface, without pressing against it too forcibly.

Figs. 10 and 11 show a form of brush similar to that illustrated in Fig. 2, except that the mounting differs therefrom in substantially the same way as the mounting in Fig. 7 differs from that in Fig. 4; in other words, an integral external sleeve 25 (Fig. 10) only is employed, or else (Fig. 11) an external sleeve made up of two parts 26 and 27. The one portion of the sleeve in either case is of reduced diameter adapted to receive and hold the inner ends of the strands composing the brush material, while the remaining portion of such sleeve is of larger internal diameter so as to leave such strands sufficiently free to partake of the torsional action hereinbefore referred to.

As illustrative of the number and variety of forms of brush that may be devised and still utilize this torsional principle, I show in Figs. 12, 13 and 14 a mounting consisting simply of an angular plate 30 having holes 31 in its one portion through which U-shaped strands are passed, the latter being held in place by a recurved section 32 of the other part of such base member.

Again in Figs. 15 and 16 is shown a mounting consisting of a plate 35 transversely slitted at one end with adjacent portions 36 and 37 bent in opposite directions and recessed at their inner ends. The wire strands are then simply threaded over and under these portions or teeth with their free portions projecting in the plane of the base, as shown in Fig. 15.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A brush comprising a suitable holder, and brush material consisting of metallic strands immovably attached at their inner ends to said holder and there fastened against torsional movement, and intermediate portions unfastened and free to partake of torsional movement, substantially as described.

2. A brush comprising a suitable holder, and brush material consisting of metallic strands immovably attached at their inner ends to said holder, said strands including outer portions designed to contact with the work, and intermediate portions angularly disposed relatively to such outer portions adapted to translate vibratory movement of the latter into torsional movement, substantially as described.

3. A rotary brush comprising a suitable holder, and brush material, consisting of metallic strands attached at their inner ends to said holder, said strands including outer portions disposed at an angle to the axis of said holder, and intermediate portions disposed approximately parallel with such axis and free to partake of torsional movement.

4. As an article of manufacture, a brush section comprising a base ring, stranded brush material looped upon said ring, and an annular metal stamping of U-shape in cross-section laterally engaging such material adjacent said ring, the intermediate portion of the material being bent at an angle to said stamping so that the strands therein lie approximately parallel to the axis of said ring, and the outer portions of such strands lying at an angle to such axis.

5. The combination with a holder comprising two cup-shaped clamping members; of a brush section comprising a base ring, stranded brush material looped upon said ring, and an annular metal stamping of U-shape in cross-section laterally engaging such material adjacent said ring, the intermediate portion of the material being bent at an angle to the plane of said stamping so that the strands therein lie approximately parallel to the axis of said ring, and the outer portions of such strands lie at an angle to such axis, said stamping and thus the inner portion of said brush section being tightly held between the bases of said clamping members, and the strands in the intermediate portion of said section being free to partake of torsional movement.

Signed by me, this 25th day of Feb., 1919.

CLINTON E. FROST.